(12) United States Patent
Weller et al.

(10) Patent No.: US 7,850,350 B2
(45) Date of Patent: Dec. 14, 2010

(54) REAR VIEW MIRROR WITH COLOURED APPEARANCE

(75) Inventors: Klaus Weller, Ebersbach (DE); Heiko Hoeber, Esslingen (DE)

(73) Assignee: SMR Patents S.a.r.l., Luxembourg (LU)

( * ) Notice: Subject to any disclaimer, the term of this patent is extended or adjusted under 35 U.S.C. 154(b) by 193 days.

(21) Appl. No.: 12/193,423

(22) Filed: Aug. 18, 2008

(65) Prior Publication Data

US 2009/0046475 A1  Feb. 19, 2009

(30) Foreign Application Priority Data

Aug. 18, 2007 (EP) ................... 07016228

(51) Int. Cl.
*B60R 1/12* (2006.01)
(52) U.S. Cl. ..................... 362/494; 362/501
(58) Field of Classification Search ............... 362/494, 362/501, 540
See application file for complete search history.

(56) References Cited

U.S. PATENT DOCUMENTS

| 5,660,457 | A |   | 8/1997 | Lyons |
| 5,711,592 | A | * | 1/1998 | Hotta ..................... 362/496 |
| 5,851,064 | A |   | 12/1998 | Lyons |
| 5,938,322 | A |   | 8/1999 | Alonzo, Jr. et al. |
| 6,049,271 | A |   | 4/2000 | Chu |
| 6,139,171 | A |   | 10/2000 | Waldmann |
| 6,142,656 | A |   | 11/2000 | Kurth |
| 6,176,602 | B1 |   | 1/2001 | Pastrick et al. |
| 6,250,784 | B1 |   | 6/2001 | Kayama |
| 6,271,750 | B1 |   | 8/2001 | Brautigam et al. |
| 6,286,983 | B1 |   | 9/2001 | Macher et al. |
| 6,299,334 | B1 |   | 10/2001 | Schwanz et al. |
| 6,315,437 | B1 |   | 11/2001 | Katz et al. |
| 6,325,517 | B1 |   | 12/2001 | Kuo |
| 6,530,683 | B1 | * | 3/2003 | Ohkohdo et al. ............ 362/511 |
| 7,192,171 | B2 |   | 3/2007 | Rodriguez Barros et al. |
| 7,255,464 | B2 |   | 8/2007 | Rodriguez Barros et al. |
| 7,258,471 | B2 |   | 8/2007 | Rodriguez Barros et al. |
| 2001/0014026 | A1 |   | 8/2001 | Ott et al. |
| 2003/0099112 | A1 |   | 5/2003 | Wilski |

FOREIGN PATENT DOCUMENTS

| DE | 19740317 | 2/1999 |
| DE | 102004054732 | 5/2006 |
| EP | 1344688 A2 | 9/2003 |
| EP | 1835224 | 9/2007 |

OTHER PUBLICATIONS

European Search Report for European patent application 07016228.4 dated Dec. 5, 2007.

* cited by examiner

*Primary Examiner*—David V Bruce
(74) *Attorney, Agent, or Firm*—Reising Ethington P.C.

(57) ABSTRACT

The invention is related to an exterior rear-view mirror for vehicles, having a mirror head with a housing in which an adjustable mirror pane is positioned and in which at least one light source is arranged which is located in an area behind a light window of the housing. Light window is part of a turn light signal device which comprises a colour screen to influence colour appearance to turn light signal not activated.

8 Claims, 5 Drawing Sheets

REAR VIEW MIRROR WITH COLOURED APPEARANCE

BACKGROUND OF THE INVENTION

The invention is based on a priority patent application EP 07016228.4 which is hereby incorporated by reference.

The present invention relates to an exterior rear view mirror for vehicles, having a mirror head with a housing in which an adjustable mirror pane is positioned and in which at least one light source is arranged which is located in an area behind a light window of the housing.

Exterior rear view mirrors are known which have a housing having at the back side a light window. In the housing of the mirror head a light bulb or a LED is provided which serves as a turn signal. The light emitted by the incandescent light source or LED penetrates through the light window to the exterior and is visible to oncoming traffic. The U.S. Pat. No. 6,139,171 describes a solution with a rear view mirror including a turn light signal. The signal lens is partly use as a light pipe to guide lights along the surface of the lens. To achieve the yellow colour of the turn light signal the LEDs are selected to emit yellow light or to emit white light passed through a yellow coloured plastic sheet.

Legislations in different countries define a yellow or amber light for the turn signal. In a result either the lens of the turn signal yellow or amber light in the mirror is coloured in yellow/orange and the light source emits white light or the light source emits coloured light in the requested wavelengths and the lens of the turn signal light is fully transparent.

It is an object of the present invention to embody the aforementioned exterior mirror such that the appearance of the lens in the mirror is coloured in a random colour without influencing the legally prescript turn signal light colour.

SUMMARY OF THE INVENTION

This object is inventively solved in that the turn light module in the mirror includes an coloured element that influence the appearance but does not influence the function and the colour of the turn light.

The use of a coloured element allows the full transparency of the light window or lens of the lighted device. So the problem with coloured light window and the decrease of light emission by absorption in the light window disappears.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 10.

Figure 1:
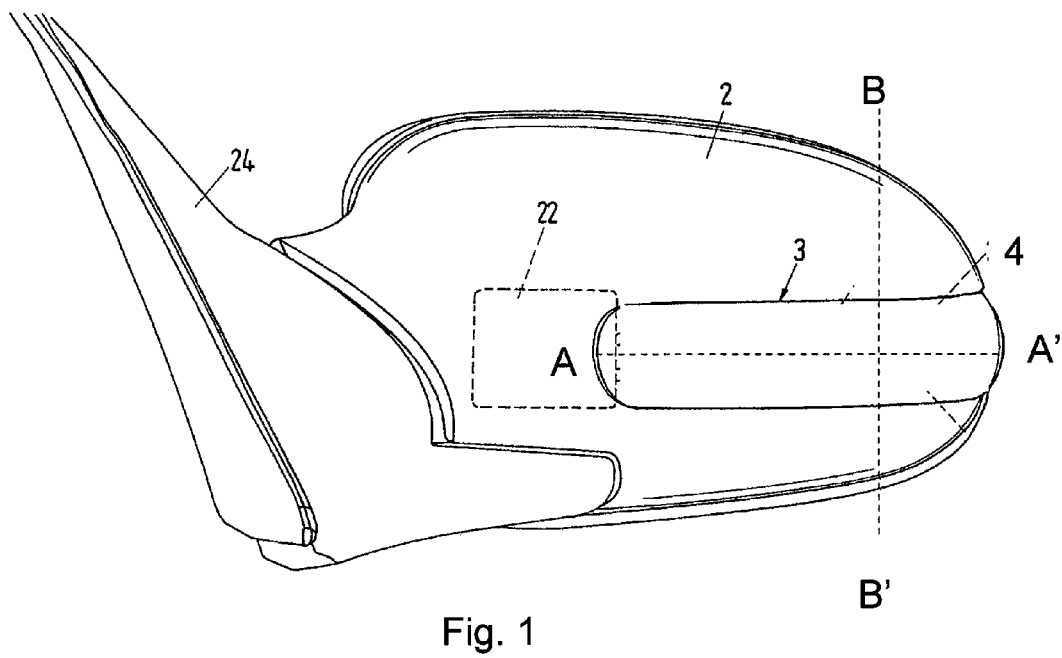
FIG. 1 is a view of the back side of the inventive exterior rear view mirror.

The exterior rear view mirror is provided for motor vehicles and has a mirror head 1 connected by a mirror support 24 to the motor vehicle. The mirror head 1 is preferably foldable relative to the mirror support so that it can be moved from a position of use into a parking position. The mirror head 1 has a mirror housing 2 whose back side is shown in FIG. 1. The mirror housing 2 has at its front side, in a manner known to a person skilled in the art, a mirror pane which is fastened to an adjustable (movable) support plate.

The back side of the housing 2 is provided with a light window 3 which is positioned in this example at half the height of the housing 2 and extends from the mirror support into the vicinity of the end of the mirror housing farthest removed from the support The light window 3 is embodied as a light guide to ensure an optimal illumination of the light window. The light window 3 is inserted into a mounting opening 4 of the mirror housing 2. The light window 3 is fixed in a known way for example with a circumferential rim which is thinner than the portion of the light window 3 mounted in the mounting opening 4. The circumferential rim rests at the inner side of the mirror housing 2 along the edge of the mounting opening 4. The light window 3 is pressed by a turn light back plate 7, mounted in the interior of the housing 2, against the inner side of the housing 2.

The outer side of the light window 3 is designed such that it forms a continuous contour of the outer side of the housing 2 in the area of the mounting opening 4.

Since the light window 3 is embodied as a light guide, the impinging light is distributed over the entire surface of the light window 3. The illuminated light window 3 is easily visible, even when the sunlight is very bright. Since the light window 3 extends substantially from the mirror support to the end of the mirror housing 2 facing away from the motor vehicle, the illuminated light window 3 can be easily and reliably detected in traffic. The light window 3 can also have other contours as the one indicated in the figure. It is also possible to employ a plurality of light windows 3. The light source within the light window 3 could be used as a turn signal light.

Figure 2:
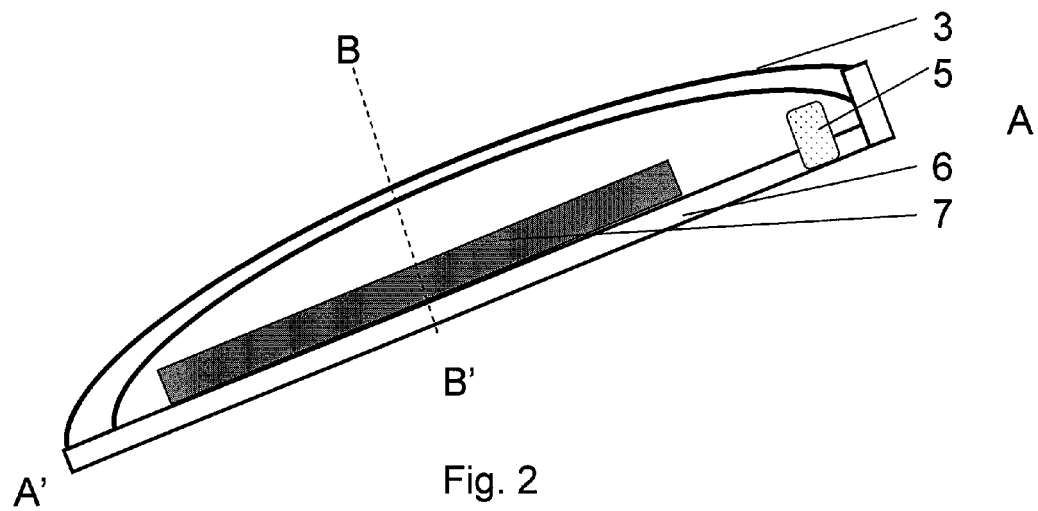
FIG. 2 is a section of the mirror head housing of a fourth embodiment of the inventive exterior rear view mirror.

FIG. 2 shows a cross section of the turn signal device mounted in the mirror along the line A-A' of FIG. 1.

The light window 3 in this embodiment is built as a light guide ensuring an optimal illumination of the light window. This light window 3, the previous is inserted into the mounting opening of the mirror housing 2. Behind the light window 3, at a defined spacing thereto, the turn signal back plate 6. is positioned. This turn signal back plate is in one embodiment part of the housing with or without reflexion capability In FIG. 2 the turn signal back plate is flat but this back plate 6 can have a shape which substantially matches the shape of the light window 3.

At the side facing away from the light window 3 a printed circuit board_not shown in the figure—is provided which has light sources in form of LEDs 5.

The turn signal back plate 6 forms a structure functionally used as reflector for the light emitted by the LEDs 5. For this purpose the back plate is coated with a thin metal layer.

To achieve a coloured appearance of the turn light device an additional colour screen 7 is integrated into the device. FIG. 2 shows a structure of the colour screen 7 adapted to the form of the turn light back plate 6 and filling the turn light device. The LED 5 emits light that is guided along the light window 3. This light must have the colour of the legal definition of turn signal light colour, in Europe amber. The amber light passes through the fully transparent light window 3 and is coupled out by the known structuring of the light guide as ripples. For a person looking at the non activated turn signal the coloured screen 7 is visible through the transparent light window 3. if the colour screen is blue the appearance of the turn signal device is blue being not activated and yellow being activated.

Figure 3:
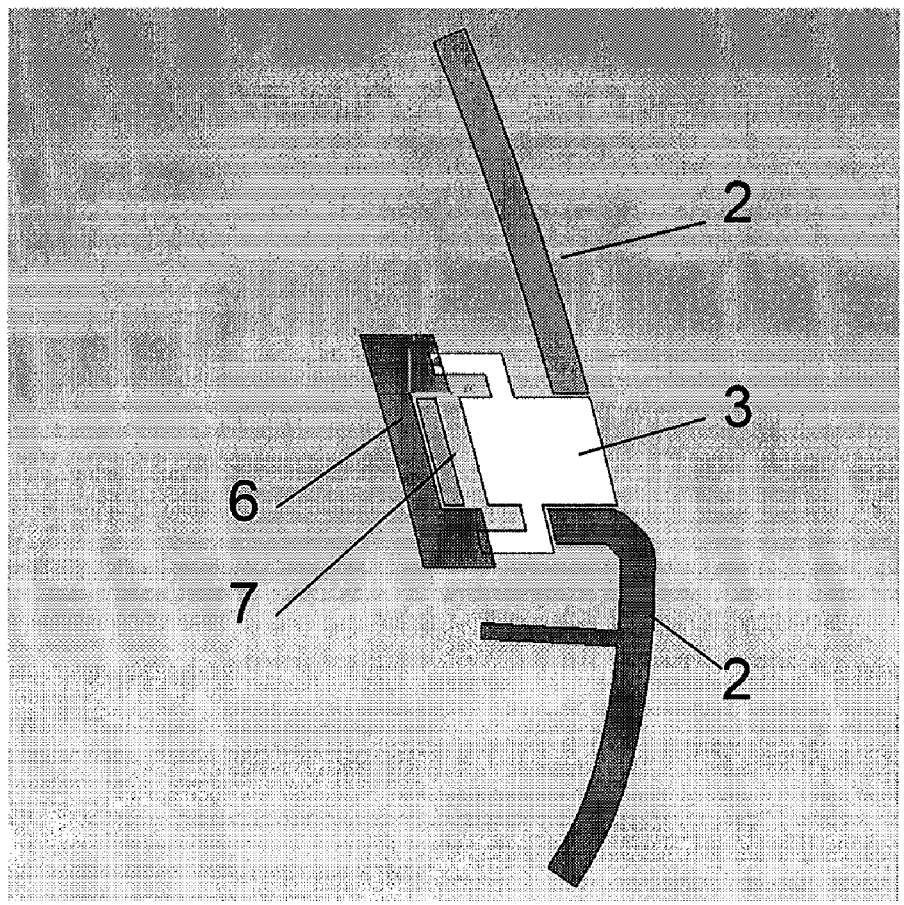
FIG. 3 shows in a representation of a turn light signal device

FIG. 3 shows a cross section along the line B-B' of FIG. 1. The turn signal device is mounted in a housing 2 of the rear view mirror, the light window 3 following the contour of the mirror. The turn light signal device consist of a turn light back plate 7 connected with the light window 3. In between the space the colour screen 7 is fixed.

The mirror described in FIG. 1 to 3 is only an example. Any kind of design with one or several lenses with complete lighting devices integrated in the mirror can be realized with the invention. The arrangement of the lighted elements in the mirror is possible wherever a person skilled in the art will do.

Another embodiment of the turn signals device is a complete separate housing with is finally accommodated in a spacing of the mirror housing or mirror bracket or of the vehicle.

The back plate, the screen, the lighting elements that can be any kind of light emitting device as LED, OLED, incandescent light source or light bulb and the light window are fixed together as a separate device.

The light window is in one embodiment a light guiding element or a light window with a part designed as a light guide dependant from the design. The light window or lens is in this embodiment welded or glued with the back plate to form the housing. The whole separate device is prepared to be fixed in a spacing at a vehicle. The fixation is done by special fixing parts to weld with the vehicle or mirror or by screws or clips or be gluing.

Figure 4:
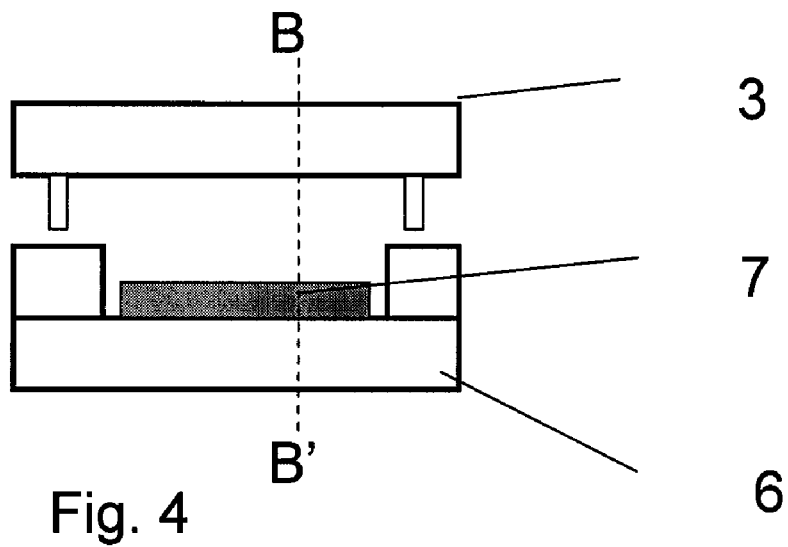
FIG. 4 is first embodiment of the turn light signal device

FIG. 4 shows a schematic extract of FIG. 3 with the turn signal back plate 6 the light window 3 prepared to be connected to the turn light back plate 6 and the colour screen in between. The colour screen is a plastic plate translucent pigmented in the colour which should be achieved. The colour screen in this example is spread over the whole inner surface of the turn signal back plate 6.

In an embodiment wherein the colours screen is spread over the whole inner surface of the lighted device the reflective layer is coated on the backside of the colour screen.

For design reasons other embodiments as described in the FIGS. 5 to 8 are possible.

Figure 5:
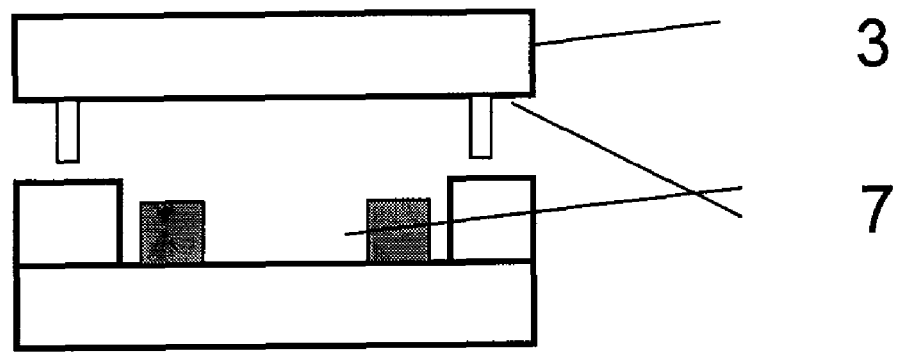
FIG. 5 is a second embodiment of the turn light signal device

FIG. 5 shows two colour screens 7 spaced apart each others which form a structure like a bezel for the turn light device The mirror appears with e.g. a blue bezel and the colour of the turn signal back plate for the turn light signal The screens can also have a continuous contour.

Figure 6:
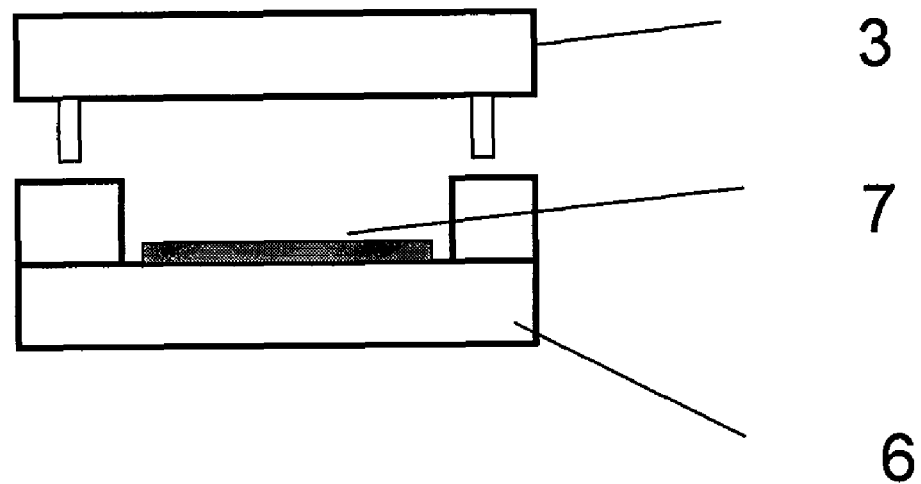
FIG. 6 is a third embodiment of the turn light signal device

FIG. 6 shows an embodiment with a foil glued or attached by adhesion to the turn signal back plate 6. This foils is functional the same as the colour screen.

Figure 7:
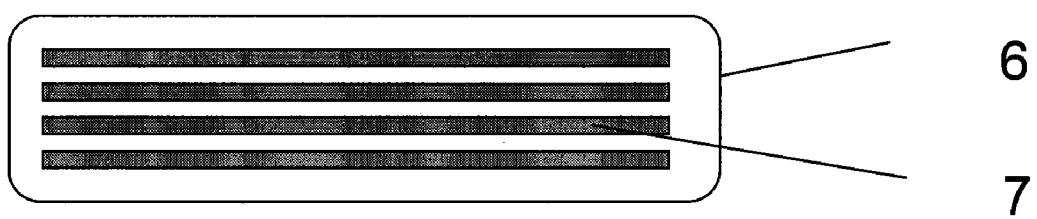
FIG. 7 is a fourth embodiment of the turn light signal device

FIG. 7 shows a structure with parallel columns of colour screens.

Figure 8:
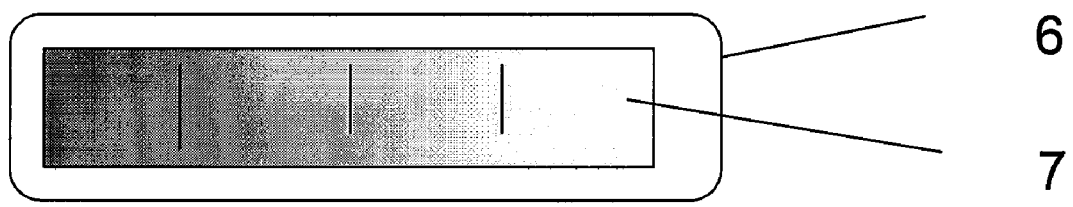
FIG. 8 is a fifth embodiment of the turn light signal device

FIG. 8 shows an example of a colour screen with degrading colour from one end to another.

The use of the coloured plastic screen allows a wide range of designs to match appearance in colour to customer wished.

Figure 9:
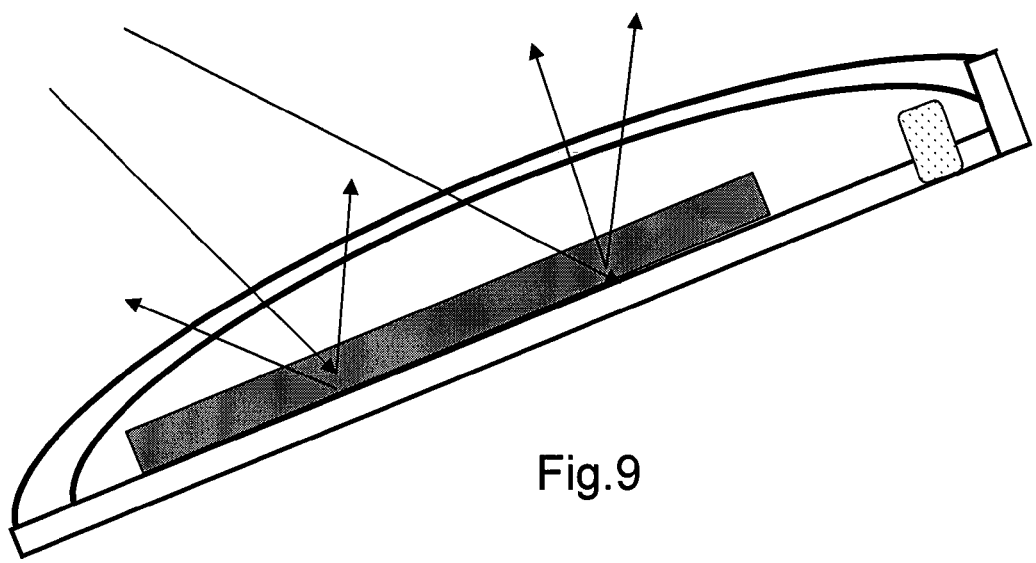
FIG. 9 is a schematic view of light reflected without activated turn signal
Figure 10:
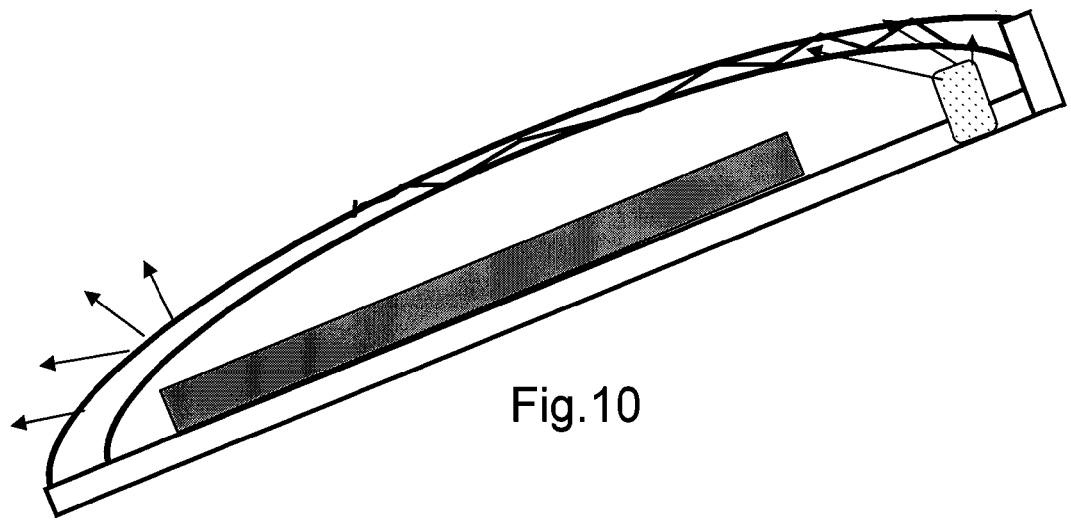
FIG. 10 is a schematic view of light emitted by activation of turn signal

FIG. 9 shows the way of a normal incident light beam. The normal light beam is reflected mainly from the back plate which forms a reflector. The light beams pass through the colour screen twice before they are visible for a person. Therefore the colour is selected by the colour of the semi transparent colour screen and the density of the pigmentation.

The process steps for the production of the light device are
Moulding a back plate with reflecting features
Integrating a coloured screen with the back plate
Installing at least one light source
Encasing the device by a light window.

In another process the reflecting features contributed by the coloured screen.

The first step is the injection moulding of a back plate part which functions as a reflector for the light.

The reflector is in a preferred embodiment a light reflecting plastic material in a bright colour which can be over moulded by a translucent pigmented material to build the screen. The preferred colours for the reflector parts are white or a light grey.

Than the colour screen must be integrated into the back plate. The integration can be done in several ways. In one preferred way the colour screen is injection moulded directly on top of the turn signal back plate 6 in a two component moulding tool. The direct two component moulding process avoids further steps to mount the colour screen on top of the turns signal back plate.

In another embodiment the colour screen is produced as a separate component especially if the colour should have degrading colour strength. To produce a separate screen method available for a person skilled in art are used as: injection moulding, stamping out of a plastic plate, stamping out of a foil.

Than the colours screen is mounted in the conventional ways, as to put into grooves, to clips on, to fix by screws or to weld on.

The foil colour screen is fixed by gluing or by functional grip. The foil has in one embodiment a reflective fist layer followed by the colour layer. The foil is an another advantageous solution self gluing.

The invention is also useful for other lighting devices in a rear view mirror. Often a security light or a position light is positioned in the mirror head or the mirror bas of an exterior mirror assembly. The security light comprises a light window and a back plate on which a coloured screen is attached. The Light source is emitting the light to illuminate ground along the vehicle. The appearance of the ground light is defined in the same way as described for the turn light signal by the structure of the coloured screen.

A rear view mirror according the invention can comprise several lighted devices as the security light and a turn light.

The present invention is, of course, in no way restricted to the specific disclosure of the specification and drawing, but also encompasses any modifications within the scope of the appended claims.

The invention claimed is:

1. A rear view mirror for a vehicle including a mirror head with a housing in which at least one light area is arranged including a turn light signal device with a light window and a turn light back plate and at least one colour emitting light source, the light window is a fully transparent light guide for the colour emitting light source, characterized in that the turn light signal device includes a separate colour screen in front of a reflector visible through the light window positioned in a way the light of the light source is not passing directly though the colour screen.

2. A rear view mirror according claim 1 wherein the colour screen is structured in a defined design to fill at least a part of the lighting device.

3. A process to produce a lighting device with a light window and a turn light back plate and at least one colour emitting light source, the light window is a fully transparent light guide for the colour emitting light source, characterized in that the turn light signal device includes a separate colour screen in front of a reflector visible through the light window positioned in a way the light of the light source is not passing directly though the colour screen wherein Moulding a back plate with reflecting features
    Integrating a coloured screen with the back plate
    Installing at least one light source
    Encasing the device by a light window.

4. A process according claim 3 wherein the integration step is done with clips.

5. A process according claim 3 wherein the integration step is done by two component injection moulding process.

6. A process according claim 3 wherein the integration step is done by gluing.

7. A process according claim 3 wherein the integration step is done by welding.

8. A process to produce a lighting device with a light window and a turn light back plate and at least one colour emitting light source, the light window is a fully transparent light guide for the colour emitting light source, characterized in that the turn light signal device includes a separate colour screen in front of a reflector visible through the light window positioned in a way the light of the light source is not passing directly though the colour screen wherein Moulding a back plate without reflecting features
    Integrating a coloured screen with reflecting features with the back plate
    Installing at least one light source and
    Encasing the device by a light window.

* * * * *